(12) United States Patent
Zhang et al.

(10) Patent No.: US 12,306,948 B2
(45) Date of Patent: May 20, 2025

(54) BASEBOARD MANAGEMENT CONTROLLER MODULE

(71) Applicant: Shenzhen Fulian Fugui Precision Industry Co., Ltd., Shenzhen (CN)

(72) Inventors: Lin Zhang, Shenzhen (CN); Wen-Xiao Lu, Shenzhen (CN); Hui-Bo Liu, Shenzhen (CN); Zhi-Yu Deng, Shenzhen (CN)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 354 days.

(21) Appl. No.: 17/850,034

(22) Filed: Jun. 27, 2022

(65) Prior Publication Data

US 2023/0334155 A1  Oct. 19, 2023

(30) Foreign Application Priority Data

Apr. 15, 2022 (CN) .......................... 202210414880.1

(51) Int. Cl.
*G06F 21/57* (2013.01)
*G06F 13/40* (2006.01)
*G06F 21/55* (2013.01)
*G06F 21/73* (2013.01)
*G06F 21/85* (2013.01)

(52) U.S. Cl.
CPC ........ *G06F 21/572* (2013.01); *G06F 13/4022* (2013.01); *G06F 13/4027* (2013.01); *G06F 21/554* (2013.01); *G06F 21/73* (2013.01); *G06F 21/85* (2013.01)

(58) Field of Classification Search
None
See application file for complete search history.

(56) References Cited

U.S. PATENT DOCUMENTS

| | | | |
|---|---|---|---|
| 2008/0060068 A1* | 3/2008 | Mabayoje | G06F 21/31 726/9 |
| 2012/0131361 A1* | 5/2012 | Chang | H04L 12/12 713/310 |
| 2013/0110926 A1* | 5/2013 | Yu | H05K 7/20836 709/204 |
| 2013/0325998 A1* | 12/2013 | Hormuth | H04L 41/06 709/212 |
| 2018/0275733 A1* | 9/2018 | Hayashi | H02J 1/10 |
| 2019/0129880 A1* | 5/2019 | Zhu | G06F 13/4282 |

FOREIGN PATENT DOCUMENTS

WO  WO-2018227042 A1 * 12/2018 ........... G06F 3/0613

* cited by examiner

*Primary Examiner* — William J. Goodchild
(74) *Attorney, Agent, or Firm* — ScienBiziP, P.C.

(57) ABSTRACT

A data center security control module able to connect with motherboards of different platforms such as Intel platform, AMD platform, and Ampere platform includes a baseboard management controller (BMC), a chip selection module, and a control module. The BMC outputs an alarm signal. The chip selection module includes N chip selection units, the chip selection unit outputting alarm signal to an external motherboard which is connected to the data center security control module. The control module obtains information as to motherboard type being Intel platform, or AMD platform, or Ampere platform and outputs a control signal to the chip selection module according to the motherboard type to start the chip selection unit associated with such motherboard type. The application also provides a data center security control module control method.

8 Claims, 3 Drawing Sheets

BASEBOARD MANAGEMENT CONTROLLER MODULE

TECHNICAL FIELD

The present disclosure relates to the server field, in particular to a data center security control module and a control method thereof.

BACKGROUND

In the server field, the data center security control module (DC-SCM) can use the enhanced serial peripheral interface (ESPI) bus to communicate with the peripherals on the motherboard. The DC-SCM is a specification with standardized data center security interface, it integrates the common management, security and control functions of the server from the typical processor motherboard to a small general module, including firmware information on the typical motherboard, providing convenience for developers and users.

The DC-SCM is independent, it can be used as a component of the motherboard and can be plugged into different motherboards. However, the motherboards of different platforms (such as Intel platform, AMD platform and Ampere platform) have requirements for the alert signal transmitted on the ESPI bus. Adapting the alert signal on the data center security control module to different motherboards is problematic.

Therefore, improvement is desired.

DETAILED DESCRIPTION

The technical solutions in the embodiments of the present disclosure will be described in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

It should be noted that the terms "first" and "second" are only used for descriptive purposes and cannot be understood as indicating or implying relative importance or implicitly indicating the number of indicated technical features. The features defining "first" and "second" may include one or more of the features, either explicitly or implicitly. For example, "first electronic component" and "second electronic component" are simply used to represent two electronic components. In the description of this embodiment, unless otherwise specified, "multiple" means two or more.

Figure 1:
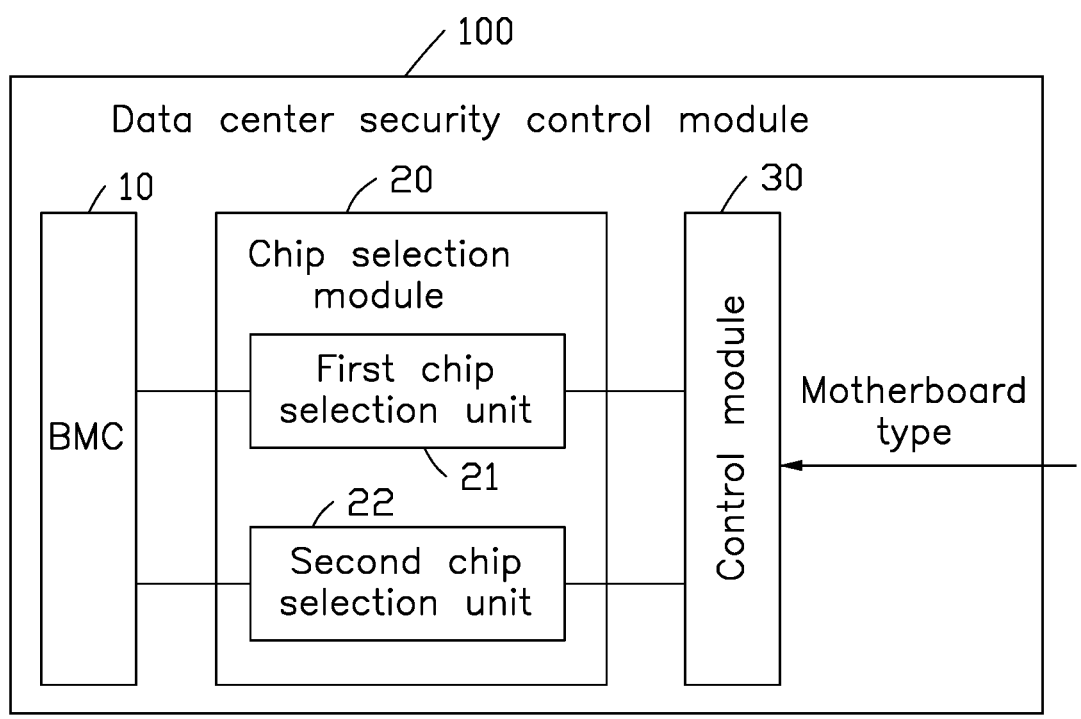
FIG. 1 is a schematic diagram of a data center security control module according to an embodiment of the present disclosure.

FIG. 1 illustrates a data center security control module 100 in accordance with an embodiment of the present disclosure.

Figure 2:
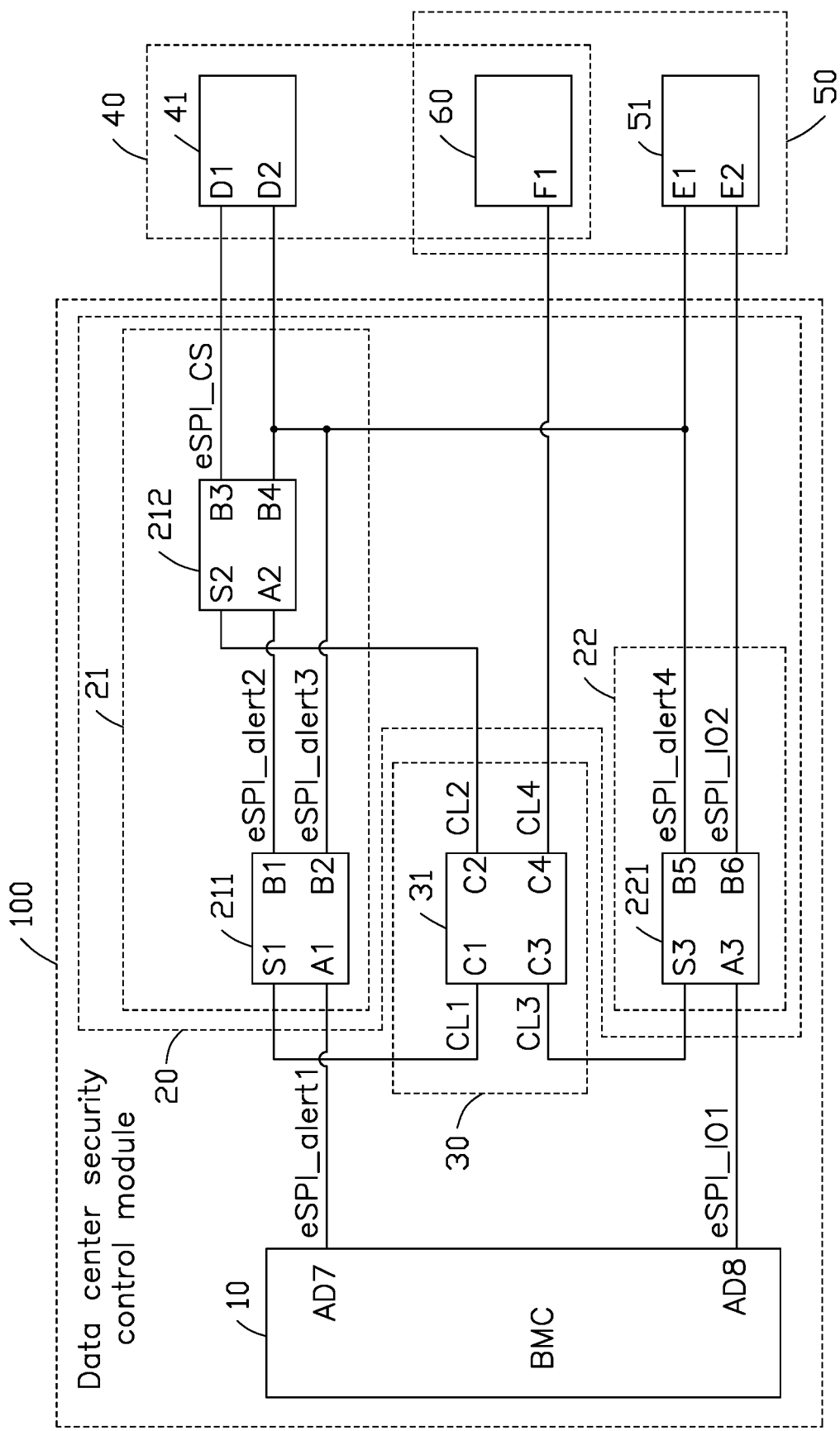
FIG. 2 is a circuit diagram of the data center security control module of FIG. 1.

The data center security control module 100 includes a baseboard management controller (BMC) 10, a chip selection module 20, and a control module 30. The data center security control module 100 can be plugged into a computer system (such as a server) that supports DC-SCM. The data center security control module 100 is connected to an external motherboard (Intel platform motherboard 40 or AMD platform motherboard 50) as shown in FIG. 2. In one embodiment, the control module 30 may be a hardware device with a control function, that is, the control module 30 may have a controller.

Taking the data center security control module 100 as an example that can be applied to Intel platform, AMD platform, and Ampere platform, the external motherboard can be the motherboard of the Intel platform, the AMD platform, or the Ampere platform.

The BMC 10 is an independent service processor, which is used to manage and monitor each hardware device in the computer system. For example, the BMC 10 can be used to manage the server, including error query, error warning, error reporting, and isolation on error of hardware devices.

The chip selection module 20 includes N chip selection units, N is an integer greater than 1. The type and quantity of the chip selection units in the chip selection module 20 are set according to the platforms that the DC-SCM can support.

For example, if the first chip selection unit 21 is compatible with the Intel platform motherboard for the alert signal on the ESPI bus, the first chip selection unit 21 is associated with the Intel platform motherboard type, and the alert signal can be an alarm signal. The first chip selection unit 21 includes a chip selection signal line eSPI_CS (shown in FIG. 2) for connecting to the Intel platform. The ESPI_CS signal required by the Intel platform is transmitted between the data center security control module 100 and the Intel platform through the chip selection signal line eSPI_CS. The ESPI_CS signal is used to select the device or chip on the server plugged into the data center security control module 100. For example, as shown in FIG. 2, the platform controller hub (PCH) on the Intel platform can be selected.

For the AMD platform and Ampere platform motherboards for the alert signal on the ESPI bus, the second chip selection unit 22 can be compatible with the AMD platform or the Ampere platform for the alert signal on the ESPI bus, and the second chip selection unit 22 is associated with the type of the AMD platform or the Ampere platform motherboard. The second chip selection unit 22 includes an input signal line ESPI_IO1 (shown in FIG. 2) for connection with the BMC 10 and an output signal line ESPI_IO2 (shown in FIG. 2) for connection with the AMD platform or the Ampere platform. The ESPI_IO signal required by the AMD platform or the Ampere platform is transmitted between the data center security control module 100 and the AMD platform or between the data center security control module 100 and the Ampere platform through the input signal line ESPI_IO1 and the output signal line ESPI_IO2. The ESPI_IO signal includes information in form of data. For example, the data information can be the BIOS startup process (such as run BIOS stage) and other information that will be exchanged between the PCH and the BMC 10 of the server during the BIOS startup process in the server.

Both the first chip selection unit 21 and the second chip selection unit 22 include a signal line for transmitting an alert signal. The signal line can be used to transmit alarm information between the data center security control module 100 and the Intel platform, between the data center security control module 100 and the AMD platform, and between the data center security control module 100 and the Ampere platform. It is understood that the first chip selection unit 21 may be a first chip selector, and the second chip selection unit 22 may be a second chip selector.

The control module 30 is used to obtain information as to the motherboard type of the computer system into which the current data center security control module 100 is plugged. When the user inserts the data center security control module 100 into the Intel platform, the data center security control module 100 can request the Intel platform for its motherboard type, or the Intel platform can actively send its motherboard type to the control module 30 of the data center security control module 100.

For example, the first chip selection unit 21 corresponds to the Intel platform and the second chip selection unit 22 corresponds to the AMD platform design. If the control module 30 obtains the motherboard type of the currently inserted motherboard as being Intel platform motherboard 40, the control module 30 inputs the corresponding control signal to the first chip selection unit 21 to activate the first chip selection unit 21, the first chip selection unit 21 can transmit the alert signal to the Intel platform motherboard 40 according to the requirements of the Intel platform motherboard 40 for the alert signal. If the control module 30 obtains the motherboard type of the currently inserted motherboard as being AMD platform motherboard 40, the control module 30 inputs the corresponding control signal to the second chip selection unit 22 to activate the second chip selection unit 22, the second chip selection unit 22 can transmit the alert signal to the Intel platform motherboard 40 according to the requirements of the AMD platform motherboard 50 for the alert signal.

The above data center security control module 100 may also include BMC flash, BIOS flash, TPM (trusted platform module), etc. The BMC flash is used to store firmware of the BMC. The BIOS flash is used to store BIOS firmware. The TPM is used for server security.

The functional modules illustrated in the embodiments of the present disclosure do not constitute specific limitations on the data center security control module 100. In other embodiments of the present disclosure, the data center security control module 100 may include more or fewer components than shown in the figure, or combine some components, or split some components, or have different component arrangements. The illustrated components may be implemented in hardware, software, or a combination of software and hardware.

Referring to FIG. 2, the BMC 10 includes a first port AD7 and a second port AD8. The first port AD7 can be implemented as the AD7 port on the BMC 10, and the second port AD8 can be implemented as the AD8 port on the BMC 10.

It can be understood that the BMC 10 can also include other ports to realize error query, error early warning, error reporting, and isolation on error functions of hardware devices, which are not specifically limited in the embodiments of the present disclosure.

The chip selection module 20 includes a first multiplexer 211, a second multiplexer 212, and a first chip selection unit 213. The first multiplexer 211 includes a first selection end S1, a first input end A1, a first output end B1, and a second output end B2. The second multiplexer 212 includes a second selection end S2, a second input end A2, a third output end B3, and a fourth output end B4. The third multiplexer 221 includes a third selection end S3, a third input end A3, a fifth output end B5, and a sixth output end B6.

The chip selection module 20 further includes a first alarm signal line eSPI_alert1, a second alarm signal line eSPI_alert2, a third alarm signal line eSPI_alert3, a chip selection signal line eSPI_CS, an input signal line eSPI_IO1, an output signal line eSPI_IO2, and a fourth alarm signal line eSPI_alert4.

The first port AD7 of the BMC 10 can pass on the first alarm signal line eSPI_alert1 connected to the first input end A1 of the first multiplexer 211. The second port AD8 of the BMC 10 can be connected to the BMC 10 through the input signal line eSPI_IO1 which is connected to the third input end A3 of the third multiplexer 221.

The first output end B1 of the first multiplexer 211 may pass on the second alarm signal line eSPI_alert2 which is connected to the second input end A2 of the second multiplexer 212. The second output end B2 of the first multiplexer 211 may pass on the third alarm signal line eSPI_alert3 which is connected to the fourth output end B4 of the second multiplexer 212. The third output end B3 of the second multiplexer 212 is connected to the first end D1 of the integrated south bridge 41 on the Intel platform motherboard 40 through the chip selection signal line eSPI_CS. The fourth output end B4 of the second multiplexer 212 is connected to the second end D2 of the integrated south bridge 41. The second output end B2 of the first multiplexer 211 is connected to the second end D2 of the integrated south bridge 41 through the third alarm signal line eSPI_alert3. The second output end B2 of the first multiplexer 211 is connected to the fifth output end B5 of the third multiplexer 221 through the third alarm signal line eSPI_alert3. The second output end B2 of the first multiplexer 211 is connected to the first end E1 of the central processing unit (CPU) 51 through the third alarm signal line eSPI_alert3.

The fifth output end B5 of the third multiplexer 221 is connected to the first end E1 of the CPU 51 through the fourth alarm signal line eSPI_alert4. The fifth output end B5 of the third multiplexer 221 is connected between the second output end B2 and the fourth output end B4 through the fourth alarm signal line eSPI_alert4. The sixth output end B6 of the third multiplexer 221 is connected to the second end E2 of the CPU 51 for the output signal line eSPI_IO2.

The first chip selection unit 21 is composed of a first multiplexer 211 and a second multiplexer 212. In the present disclosure, the first multiplexer 211 may be multiplexed, and the second chip selection unit 22 may be composed of the first multiplexer 211 and the third multiplexer 221. Therefore, device cost can be reduced and the plate area can be saved.

The control module 30 includes a first complex programmable logic device (CPLD) 31, the first CPLD 31 is used for logic control and information interaction with the motherboard. The first CPLD 31 includes a first control end C1, a second control end C2, a third control end C3, and an input end C4.

The control module 30 further includes a first control line CL1, a second control line CL2, a third control line CL3, and an input line CL4. The first control end C1 of the control module 30 is connected to the first selection end S1 of the first multiplexer 211 through the first control line CL1. The second control end C2 of the control module 30 is connected to the second selection end S2 of the second multiplexer 212 through the second control line CL2. The third control end C3 of the control module 30 is connected to the third selection end S3 of the third multiplexer 221 through the third control line CL3. The input end C4 of the control module 30 is connected to the Intel platform motherboard 40, to the AMD platform motherboard 50, or to the output end F1 of the second CPLD 60 on the Ampere platform motherboard through the input line CL4.

As shown in FIG. 2, the Intel platform, the AMD platform, or the Ampere platform each include their own complex programmable logic devices. If the data center security control module 100 is inserted into the Intel platform, the data center security control module 100 establishes a connection with the Intel platform motherboard 40, the second CPLD 60 in FIG. 2 represents a complex programmable logic device of the Intel platform. The other end of the input line CL4 is connected to the output end F1 of the second CPLD 60 on the Intel platform. The first CPLD 31 obtains information as to the motherboard type transmitted by the second CPLD 60 of the Intel platform.

If the data center security control module 100 is inserted into the AMD platform or the Ampere platform, the data center security control module 100 establishes a connection with the AMD platform motherboard 50 or the Ampere platform motherboard, the second CPLD 60 in FIG. 2 represents a complex programmable logic device of the AMD platform or the Ampere platform. The other end of the input line CL4 is connected to the output end F1 of the second CPLD 60 on the AMD platform or on the Ampere platform. The first CPLD 31 obtains the motherboard type transmitted by the second CPLD 60 of the AMD platform or the Ampere platform.

The first CPLD 31 can actively request information as to the motherboard type of the platform from the second CPLD 60. The first CPLD 31 may also receive the motherboard type of the platform sent by the second CPLD 60.

The PLANTE_TYPE0/1 signal is transmitted between the first CPLD 31 and the second CPLD 60 through the input line CL4. When the PLANTE_TYPE0/1 signal is 00, the first CPLD 31 obtains information that the motherboard type of the motherboard currently connected is the Intel platform motherboard 40. According to the requirements of the Intel platform, the first CPLD 31 uses the first control signal CS1 to select one of the two paths of the first multiplexer 211 and uses the second control signal CS2 to select one of the two paths of the second multiplexer 212.

If the first control signal CS1 is at a high level, the first multiplexer 211 turns on its first input end A1 and first output end B1. The second control signal CS2 is at a high level, and the second multiplexer 212 turns on the connection between the second input end A2 and the third output end B3.

If the first control signal CS1 is at a low level, the first multiplexer 211 turns on its first input end A1 and second output end B2. The second control signal CS2 is at a low level, and the second multiplexer 212 turns on the connection between the second input end A2 and the fourth output end B4.

In another embodiment, the following control modes can also be set; the first control signal CS1 is at a high level, the first multiplexer 211 turns on the connection between the first input end A1 and the second output end B2. The first control signal CS1 is at a low level, the first multiplexer 211 turns on the connection between the first input end A1 and the first output end B1. The second control signal CS2 is at a high level, the second multiplexer 212 turns on the connection between the second input end A2 and the fourth output end B4, the second control signal CS2 is at a low level, and the second multiplexer 212 turns on the connection between the second input end A2 and the third output end B3.

When the PLANTE_TYPE0/1 signal is 10, the first CPLD 31 obtains the motherboard type of the currently connected motherboard as being the AMD platform motherboard.

When the PLANTE_TYPE0/1 signal is 10, the first CPLD 31 obtains the motherboard type of the currently connected motherboard as being the Ampere platform motherboard. According to the requirements of the AMD platform, the first CPLD 31 uses the first control signal CS1 to select one of the two paths of the second chip selection unit 22. If the third control signal CS3 is at a high level, the third multiplexer 221 turns on the connection between the third input end A3 and the fifth output end B5. The third control signal CS3 is at a low level, and the first multiplexer 211 turns on the connection between the third input end A3 and the sixth output end B6.

In another embodiment, the following control modes can also be set; when the third control signal CS3 is at a low level, the third multiplexer 221 turns on the connection between the third input end A3 and the fifth output end B5. Accordingly, the third control signal CS3 is at a high level, and the third multiplexer 221 turns on the connection between the third input end A3 and the sixth output end B6.

The operating principle of the data center security control module 100 is as follows.

Figure 3:
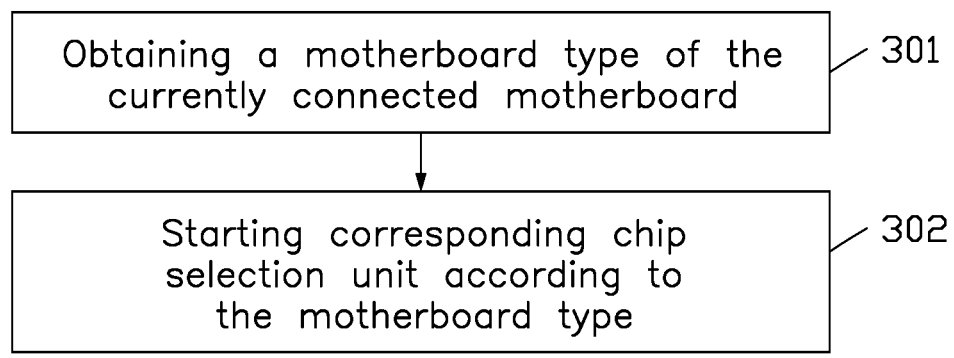
FIG. 3 is a flowchart of a method for using the control module for data center security according to an embodiment of the present disclosure.

FIG. 3 is a flowchart depicting an embodiment of a data center security control module control method. The data center security control module control method can be applied to the data center security control module 100 in FIG. 1 or FIG. 2 above, and the data center security control module control method can be executed by the control module 30.

Each block shown in FIG. 3 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 301.

At block 301, obtaining information as to motherboard type of the currently connected motherboard.

At block 302, starting a chip selection unit according to the motherboard type.

As shown in FIG. 2, suppose the user inserts the data center security control module 100 into the Intel platform. The data center security control module 100 establishes connection with the Intel platform motherboard 40. The first CPLD 31 obtains the signal as to motherboard type (PLANTE_TYPE0/1 signal) transmitted by the second CPLD 60 on the Intel platform.

The first CPLD 31 detects that the PLANTE_TYPE0/1 signal is 00, the first CPLD 31 can output the first control signal CS1 to the first selection end S1 of the first multiplexer 211 through the first control line CL1, and the first CPLD 31 can output the second control signal CS2 to the second selection end S2 of the second multiplexer 212 through the second control line CL2. The first CPLD 31 does not output the third control signal CS3 to the third selection end S3 of the third multiplexer 221. That is, when the currently connected motherboard type is the Intel platform motherboard 40, the first chip selection unit 21 is started, and the second chip selection unit 22 is not started.

If the first CLPD 31 outputs the first control signal CS1 at the high level and the second control signal CS2 at the high level according to the requirements of the Intel platform, the first multiplexer 211 turns on the connection between the first input end A1 and the first output end B1, and the second multiplexer 212 turns on the connection between the second input end A2 and the third output end B3.

The first input end A1 of the first multiplexer 211 receives the alert signal transmitted by the BMC 10 through the first alarm signal line eSPI_alert1. The first multiplexer 211 transmits the alert signal received by the first input end A1 to the second input end A2 of the second multiplexer 212 through the second alarm signal line eSPI_alert2. The second multiplexer 212 transmits the ESPI_CS signal to the first end D1 of the integrated south bridge 41 through the chip selection signal line eSPI_CS.

If the BMC 10 outputs an alert signal to the first multiplexer 211, the first input end A1 receives the alert signal at the high level, and the second multiplexer 212 outputs an ESPI_CS signal at high level. The first end D1 of the integrated south Bridge 41 receives the ESPI_CS signal at the high level. The ESPI_CS signal at the high level means that the integrated south Bridge 41 is selected by the BMC 10. If the BMC 10 does not output an alert signal to the first multiplexer 211, the second multiplexer 212 outputs an ESPI_CS signal at low level. The first end D1 of the integrated south Bridge 41 receives the ESPI_CS signal at the low level. The ESPI_CS signal at the low level means that the integrated south Bridge 41 is not selected by the BMC 10.

If the first CLPD 31 outputs the first control signal CS1 at the low level according to the requirements of the Intel platform, the first multiplexer 211 turns on the connection between the first input end A1 and the second output end B2, and the first multiplexer 211 transmits the alert signal received from the first input end A1 to the second end D2 of the integrated south bridge 41 through the third alarm signal line eSPI_alert3.

In some embodiments, the first CLPD 31 outputs the first control signal CS1 at the high level and the second control signal CS2 at the low level according to the requirements of the Intel platform. The first multiplexer 211 turns on the connection between the first input end A1 and the first output end B1, the second multiplexer 212 turns on the connection between the second input end A2 and the fourth output end B4, and the fourth output end B4 outputs the alert signal received by the first input end A1 and transmits the alert signal to the second end D2 of the integrated south bridge 41.

Suppose that the user inserts the data center security control module 100 into the AMD platform; the data center security control module 100 establishes connection with the AMD platform motherboard 50 and the first CPLD 31 obtains the motherboard type (PLANTE_TYPE0/1 signal) transmitted by the second CPLD 60 on the AMD platform. The third input end A3 of the third multiplexer 221 receives the ESPI_IO signal transmitted by the BMC 10 through the input signal line eSPI_IO1.

The first CPLD 31 detects that the PLANTE_TYPE0/1 signal is 01, the first CPLD 31 can output the third control signal CS3 to the third selection end S3 of the third multiplexer 221 through the third control line CL3, and the first CPLD 31 can output the first control signal CS1 to the first multiplexer 211. That is, when the currently connected motherboard type is the AMD platform motherboard 50, the second chip selection unit 22 is started, and the first chip selection unit 21 is not started.

If the first CLPD 31 outputs the third control signal CS3 at the low level according to the requirements of the AMD platform, the third multiplexer 221 turns on the connection between the third input end A3 and the sixth output end B6. The third multiplexer 221 transmits the ESPI_IO signal received by the third input end A3 to the second end E2 of CPU 51 on AMD platform motherboard through output signal line eSPI_IO2.

If the first CLPD 31 outputs the third control signal CS3 at the high level and the first control signal CS1 at the low level according to the requirements of the AMD platform, the third multiplexer 221 turns on the connection between the third input end A3 and the fifth output end B5, and the first multiplexer 211 turns on the connection between the first input end A1 and the second output end B2. The first multiplexer 211 transmits the alert signal output from the first port AD7 of the BMC 10 to the fourth alarm signal line eSPI_alert4 through the third alarm signal lines eSPI_alert3. If the third input end A3 of the third multiplexer 221 receives the ESPI_IO signal transmitted by the BMC 10, the third multiplexer 221 transmits the alert signal and the ESPI_IO signal to the first end E1 of the CPU 51 through the fourth alarm signal line eSPI_alert4.

The above data center security control module 100 determines the motherboard type of the currently connected platform through the first CPLD, and then starts the corresponding chip selection unit to suit the motherboard of the connected platform, so that the corresponding chip selection unit can transmit the alert signal according to the requirements of the motherboard of the connected platform for the alert signal, so that the alert signal can automatically adapt to the motherboards of different platforms. The data center security control module 100 of the present disclosure can save the design cost and manufacturing cost.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A baseboard management controller (BMC) module comprising:
    a BMC configured for outputting an alarm signal; and
    a chip selection module comprising N chip selection units; wherein the chip selection unit is configured for outputting the alarm signal to an external motherboard connected to the data center security control module, wherein N is an integer greater than 1; and
    a control module configured for obtaining a motherboard type of the external motherboard and outputting a control signal to the chip selection module according to the motherboard type to start the chip selection unit associated with the motherboard type;
    wherein the chip selection module comprises a first multiplexer and a second multiplexer, the first multiplexer comprises a first selection end, a first input end, a first output end and a second output end, the second multiplexer comprises a second selection end, a second input end, a third output end and a fourth output end; the first input end of the first multiplexer is connected to a first port of the BMC, the first output end of the first multiplexer is connected to the second input end of the second multiplexer; the second output end of the first multiplexer is connected to the fourth output end of the second multiplexer; the third output end of the second multiplexer is connected to a first end of an integrated south bridge on the third platform motherboard; and the fourth output end of the second multiplexer is connected to a second end of the integrated south bridge.

2. The BMC module of claim 1, wherein the N chip selection units comprises a first chip selection unit and a second chip selection unit, the first chip selection unit outputs the alarm signal to a third platform motherboard, and the second chip selection unit outputs the alarm signal to a first platform motherboard or a second platform motherboard.

3. The BMC module of claim 2, wherein:
when the motherboard type is the third platform motherboard, the control module outputs the control signal to the chip selection module to start the first chip selection unit; and
when the motherboard type is the first platform motherboard or the second platform motherboard, the control module outputs the control signal to the chip selection module to start the second chip selection unit.

4. The BMC module of claim 3, wherein the chip selection module further comprises a first alarm signal line, a second alarm signal line, a third alarm signal line and a chip selection signal line; the first input end of the first multiplexer is connected to the first port of the BMC through the first alarm signal line, the first output end of the first multiplexer is connected to the second input end of the second multiplexer through the second alarm signal line; the second output end of the first multiplexer is connected to the fourth output end of the second multiplexer through the third alarm signal line; the third output end of the second multiplexer is connected to the first end of an integrated south bridge on the third platform motherboard, through the chip selection signal line.

5. The BMC module of claim 4, wherein the second output end of the first multiplexer is connected to the second end of the integrated south bridge through the third alarm signal line.

6. The BMC module of claim 5, wherein the chip selection module further comprises a third multiplexer, the third multiplexer comprises a third selection end, a third input end, a fifth output end and a sixth output end; the chip selection module further comprises an input signal line, an output signal line and a fourth alarm signal line; the third input end of the third multiplexer is connected to a second port of the BMC through the input signal line; the fifth output end of the third multiplexer is connected to a first end of a central processing unit (CPU) on the first platform motherboard or the second platform motherboard through the fourth alarm signal line; the sixth output end of the third multiplexer is connected to a second end of the CPU through the output signal line.

7. The BMC module of claim 6, wherein the fifth output end of the third multiplexer is connected to the first end of the CPU through the fourth alarm signal line.

8. The BMC module of claim 7, wherein the control module comprises a complex programmable logic device (CPLD), the CPLD comprises a first control end, a second control end, a third control end and an input end; the control module further comprises a first control line, a second control line, a third control line and an input line; the first control end of the control module is connected to the first selection end through the first control line; the second control end of the control module is connected to the second selection end through the second control line; the third control end of the control module is connected to the third selection end through the third control line; the input end of the control module is connected to the CPLD on the third platform motherboard, the first platform motherboard or the second platform motherboard through the input line.

* * * * *